United States Patent [19]

Kanno et al.

[11] 3,855,055

[45] Dec. 17, 1974

[54] LAMINATED SAFETY GLASS AND INTERLAYER THEREFOR

[75] Inventors: Isawo Kanno, Kyoto; Toshiyuki Takashima; Yoshiyuki Bokuda, both of Shiga, all of Japan

[73] Assignee: Sekisui Kagaku Kogyo Kabushiki Kaisha, Osaka, Japan

[22] Filed: Jan. 22, 1974

[21] Appl. No.: 435,579

Related U.S. Application Data

[62] Division of Ser. No. 238,612, March 27, 1972, Pat. No. 3,838,091.

[30] Foreign Application Priority Data

Mar. 30, 1971 Japan.......................... 46-19491

[52] U.S. Cl................. 161/199, 161/198, 161/247
[51] Int. Cl...................... B32b 17/06, B32b 17/10
[58] Field of Search ........... 161/193, 199, 203, 404, 161/1, 257; 156/106, 309; 260/32.2 R

[56] References Cited
UNITED STATES PATENTS

| | | | |
|---|---|---|---|
| 3,262,835 | 7/1966 | Lavin et al.................... | 161/199 |
| 3,424,646 | 1/1969 | Winkler et al................. | 156/106 X |
| 3,434,915 | 3/1969 | Garrison...................... | 161/199 |
| 3,551,281 | 12/1970 | Takaura et al.................. | 161/199 |
| 3,556,890 | 1/1971 | Buckley et al................. | 161/199 X |
| 3,806,387 | 4/1974 | Pectz et al.................... | 156/106 X |

*Primary Examiner*—George F. Lesmes
*Assistant Examiner*—Alan T. McDonald
*Attorney, Agent, or Firm*—Wenderoth, Lind & Ponack

[57] ABSTRACT

An interlayer for laminated safety glass comprising (1) a mixture of a plasticized polyvinyl acetal resin with a specific norbornane compound or (2) a sheet of the plasticized polyvinyl acetal resin and a coating of the norbornane compound adhering thereto, and a laminated safety glass comprising at least two sheets of glass bonded together with said interlayer.

14 Claims, No Drawings

LAMINATED SAFETY GLASS AND INTERLAYER THEREFOR

This is a division, of application Ser. No. 238,612, filed Mar. 27, 1972 now U.S. Pat. No. 3,838,091

This invention relates to an improved laminated safety glass which not only excels in resistance to penetration but also possesses satisfactory transparency and resistance to aging.

The laminated glass used heretofore has been most generally that consisting of at least two sheets of glass which are bonded by means of an interlayer of a plasticized polyvinyl acetal resin. This laminated glass is being used principally as windshields or windows of automobiles and other vehicles are well as buildings. However, in the case of an automobile accident, for example, there is the danger of being cut by the broken glass fragments or, in serious cases, of lacerations resulting from the penetration of the head when it strikes the windshield. Moreover, with the recent increase in the speeds of transportation facilities, these dangers from accidents have increased. Consequently, the safety provided by the laminated glass which is adhered and reinforced by means of only the conventional plasticized polyvinyl acetal resin has become inadequate and a demand has arisen for a laminated glass of greater resistance to penetration.

As one way of increasing the resistance to penetration, there is known a method of increasing the moisture content of the plasticized polyvinyl acetal resin. However, while an increase in resistance to penetration is achieved by increasing the moisture content of the plasticized polyvinyl acetal resin, there are on the other hand such drawbacks as the formation of bubbles in the interlayer or between the glass and the interlayer when the moisture content because 1 percent or more or a deterioration in the resistance to aging to the interlayer. Hence, a laminated glass having a satisfactory resistance to penetration cannot be obtained by this method.

On the other hand, U.S. Pat. No. 3,249,489, 3,262,837 and 3,271,235 disclose a method of improving the resistance to penetration by incorporating either a metal alkyl carboxylate or a metal salt of a saturated aliphatic dicarboxylic acid such as an acetate or propionate of an alkali, alkali earth or other metals in the plasticized polyvinyl acetal resin. Further, in Japanese patent publication No. 32071/70, there is disclosed a method of improving the resistance to penetration by adhering the interlayer surface with a known impact strength increasing additive. However, in these methods difficulty is experienced with respect to the compatibility of these additives with the plasticized polyvinyl acetal resins, there being a tendency to a decrease in transparency of the interlayer due to the addition of these additives. Further, when they are used in excess, the interlayer becomes turbid and impairment of the transparency of the laminated glass takes place. Again, another drawback is that the addition of these additives causes a deterioration of the resistance to aging of the polyvinyl acetal resin to result in the discoloration of the interlayer. During use for prolonged periods of time, the additive contained in the interlayer separates out onto the surface of the interlayer, which in turn may cause changes in the adhesive force between the glass surface and the surface of the interlayer, and adversely affect the impact strength of the laminated glass.

We have now found that the resistance to penetration of a laminated glass can be improved without reducing the transparency and resistance to aging of the conventional laminated glass. This is made possible by using in accordance with the present invention either an interlayer prepared by mixing in a customary manner a plasticized polyvinyl acetal resin with a norbornane compound of the formula

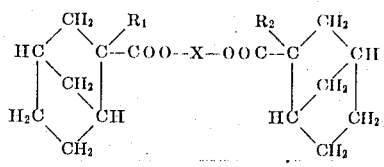

wherein $R_1$ and $R_2$ are each an alkyl group of 1 to 10 carbon atoms, and X is a bivalent metal selected from the group consisting of cadmium, barium, zinc and magnesium; or an interlayer obtained by adhering to the surface of a sheet prepared from a plasticized polyvinyl acetal resin a norbornane compound, using any of the customary techniques of spraying, dipping or coating.

A principal object of the present invention is to provide an interlayer by the use of which can be manufactured a laminated safety glass having improved resistance to penetration without a reduction of the transparency and resistance to aging of the laminated glass.

Another object of the invention is to provide a laminated safety glass of improved resistance to penetration, the improvement being achieved without a reduction of the transparency and resistance to aging of the laminated glass.

Other objects and advantages will become apparent from the following description.

As the plasticized polyvinyl acetal resin to be used in this invention, there is one consisting of a polyvinyl acetal resin obtained in a customary manner, which has been plasticized by the addition of 20 – 80 parts by weight, and preferably 20 – 50 parts by weight, of a plasticizer per 100 parts by weight of the polyvinyl acetal resin. The use of polyvinyl butyral resin as the polyvinyl acetal resin is to be particularly preferred in the present invention. Particularly convenient is polyvinyl butyral having a degree of butyralization of 55 – 75 mol percent and a vinyl acetate content of 0 – 10 mol percent with the balance being vinyl alcohol, and which has been plasticized by 20 – 50 parts by weight, per 100 parts by weight of the polyvinyl resin, of a plasticizer. As the foregoing plasticizer, those usually known as plasticizers of polyvinyl acetal resins can be used, convenient ones being triethylene glycol-di-2-ethyl butyrate, triethylene glycol-di 2-ethyl hexoate, dibutyl sebacate, dibutyl phosphate, tributyl phosphate, tricresyl phosphate, dibutyl adipate, and the like.

The norbornane compounds of the foregoing formula, which are to be either incorporated in the aforesaid plasticized polyvinyl acetal resin according to the present invention or adhered to the surface of a sheet composed of the plasticized polyvinyl acetal resin, include the compounds wherein the aforesaid $R_1$ and $R_2$ are each an alkyl group of 1 to 10 carbon atoms and the X is a bivalent metal selected from cadmium, barium, zinc and magnesium. Preferred are compounds having lower alkyl groups such as methyl and ethyl, particularly preferred being a compound having the methyl group. Further, a compound in which X is cadmium or barium is preferred. Particularly preferred is the cadmium salt of 2-methyl-norbornane-2-carboxylic acid in view of its ready availability.

The aforementioned norbornane compounds are obtained by reacting 2-alkyl-norbornane-2-carboxylic acid with a metal oxide. For example, the cadmium salt of 2-methyl-norbornane-2-carboxylic acid, which is commercially available in the name of NEODIC ACID CADMIUM (product of Sankyo Yukigosei K.K.), is obtained by reacting 2-methyl-norbornane-2-carboxylic acid with cadmium oxide.

For accomplishing the mixing of the norbornane compound in the plasticized polyvinyl acetal resin, this is achieved in the present invention by the use of a suitable agitator such as a blender or kneader, and mixing the polyvinyl acetal resin, the plasticizer and the norbornane compound intimately with stirring. In this case, the norbornane compound can, if necessary, be diluted with a suitable solvent prior to its addition and mixing. Further, a more homogeneous mixture can be achieved by first mixing the norbornane compound in the plasticizer and then mixing this with the polyvinyl acetal resin. Especially, when the norbornane compound is dissolved in a solvent such as ethylene glycol monomethyl ether, ethylene glycol monoethyl ether, ethylene glycol monopropyl ether and ethylene glycol monobutyl ether, the resulting solution is then added to the plasticizer, after which the combined solution is mixed with the polyvinyl acetal resin, and thereafter the sheet is formed, the preparation of an interlayer of plasticized polyvinyl acetal having good transparency can be carried out with good working efficiency. The norbornane compound is preferably mixed in the polyvinyl acetal resin (which is not plasticized) in an amount of 0.005 to 0.5 percent by weight based on the resin, particularly preferred being an amount ranging between 0.01 and 0.15 percent by weight. If the amount of the norbornane compound is less than the lower limit indicated above, an improvement in the resistance to penetration of the resulting laminated safety glass will not be achieved. On the other hand, when the amount of the norbornane compound exceeds the upper limit indicated above, this also is not to be desired, since a decline takes place in the adhesive force between the plasticized polyvinyl acetal resin and the glass.

The mixture of polyvinyl acetal resin, plasticizer and norbornane compound is mixed, then passed through an extruder or calender rolls in a customary manner to be formed into a film.

On the other hand, for carrying out the adhesion of the norbornane compound to the surface of a sheet composed of a plasticized polyvinyl acetal resin, suitably employable are such methods as that wherein the surface of the sheet is sprayed with a solution of the norbornane compound, that in which the norbornane compound is dissolved in a suitable solvent and the polyvinyl acetal resin sheet is dipped in the resulting solution, or that wherein the norbornane compound is made into a paste and this paste is coated to the surface of the sheet with either a knife or roll coater. The solvents which are suitably used in the foregoing methods are those solvents which dissolve the aforesaid norbornane compounds but do not, or practically do not, dissolve the polyvinyl acetal resins. Included are such, for example, as pentane and hexane, a solvent mixture of ethylene glycol monobutylether with pentane or hexane, methyl acetate and ethyl acetate, or a solvent mixture of water with methanol or ethanol. The amount of the norbornane compound to be adhered ranged between 20 – 150 mg, and preferably 40 – 80 mg per square meter of the sheet.

While the thickness of the film will be suitably varied depending upon the intended use of the laminated glass, usually one having a thickness of 0.01 – 0.2 inch, preferably 0.015 – 0.03 inch, is used for automobile and aircraft purposes.

In this invention, the interlayer of a plasticized polyvinyl acetal resin in which has been mixed a norbornane compound can also contain therein moisture, stabilizers, lubricants, dyestuffs, sizes and basic substances. Further, it is efficacious for the improvement of the resistance to penetration of the resulting laminated glass to ensure that moisture in an amount of 0.2 –0.8 percent by weight, and preferably 0.4 – 0.6 percent by weight, is contained in the interlayer. The moisture content of the interlayer can be measured by an ordinary method, for example, after allowing the sample to stand for 5 hours in an atmosphere held at 30°C. and RH 25 percent.

In this invention to the surface of the plasticized polyvinyl acetal resin sheet formed by an extruder or calender rolls may be applied a powder of sodium bicarbonate as is usually practiced commercially for preventing sticking of the sheets during their storage.

For obtaining the laminated safety glass by lamination of glass with either the interlayer formed by mixing in the norbornane compound or the interlayer obtained by adhesion of the norbornane compound to the plasticized polyvinyl acetal resin sheet, the usual method of manufacturing laminated safety glass is applicable, and no special steps or equipment are required.

The laminated safety glass can usually be readily produced by placing the interlayer of polyvinyl acetal resin between two sheets of glass of a thickness of 1 – 10 mm, preferably 2 – 5 mm and holding this assembly for 10 – 60 minutes at 85° – 165°C., preferably at 90°– 130°C., under a pressure of 8 – 16 kg/cm$^2$, preferably 10 – 14 kg/cm$^2$.

In the present invention, no bubbles are formed inside the laminated glass, nor is there a decline in the transparency or resistance to aging of the glass. Neither is there a decline in the various other properties required of a laminated glass. On the other hand, there is an improvement in the resistance to penetration of the laminated safety glass.

The following examples and control experiment, are given to illustrate the impovement in resistance to penetration of the laminated glass of the present invention as well as its superior transparency. In the example and control experiments, the parts and percent are on a weight basis.

Example 1

To 100 parts of polyvinyl butyral resin of a degree of polymerization, calculated as polyvinyl alcohol, of 1700 and having the composition of a degree of butyralization of 65 mol percent, a degree of acetylation of 1 mol percent and a degree of alcoholization of 34 mol percent was added a combined solution of 70 percent solution in ethylene glycol monomethyl ether of 0.1 part (about 0.14 part as solution) of a cadmium salt of 2-methyl-norbornane-2-carboxylic acid and 40 parts of triethylene glycol-di-2-ethyl butyrate, after which the mixture was intimately kneaded with stirring. The mixture was then extrusion molded with an extruder to obtain a film of 0.03 inch thickness. This film was allowed to stand for 5 hours in an atmosphere held at 30°c. and RH 25 percent to adjust its moisture content to 0.5 percent. Then, the film was interposed between two glass sheets having a thickness of 3 mm, and heated to 80°C. At a pressure of 10 kg/cm$^2$, the temperature was raised up to 130°C. in the course of 30 minutes, and then, the laminated glass was cooled to room temperature in the course of 30 minutes under the same pressure conditions.

Example 2

A laminated glass was prepared as in Example 1 by repeating the same procedure except that instead of the 70 percent solution in ethylene glycol monomethyl ether of 0.1 part of a cadmium salt of 2-methyl-norbornane-2-carboxylic acid a 70 percent solution in the same solvent of 0.1 part of a barium salt of 2-methyl-norbornane-2-carboxylic acid was used.

Control 1

Except that the cadmium salt of 2-methyl-norbornane-2-carboxylic acid was not used, the experiment was other-wise carried out exactly as in Example 1 to prepare a laminated glass.

Example 3

The polyvinyl acetal resin film obtained in Control 1 was dipped in a 0.15 percent solution of a cadmium salt of 2-methyl-norbornane-2-carboxylic acid in normal hexane and containing 0.05 percent of ethylene glycol monobutyl ether and taken from the solution and dried. The foregoing compound was adhered in an amount of 60 milligrams per square meter to the film surface. In the same manner as in Example 1, after adjusting this film to a moisture content of 0.5 percent by weight, it was sandwiched between two sheets of 3 - mm-thick sheet glass and heat-pressed to prepare a laminated glass.

Example 4

To 100 parts of polyvinyl butyral resin of a degree of polymerization, calculated as polyvinyl alcohol, of 1700 and having the composition of a degree of butyralization of 65 mol percent, a degree of acetylation of 1 mol percent and a degree of alcoholization of 34 mol percent was added a combined solution of 70 percent solution in ethylene glycol monobutyl ether of 0.05 part (about 0.07 part as solution) of a cadmium salt of 2-methyl-norbornane-2-carboxylic acid and 40 parts of triethylene glycol-di-2-ethyl butyrate, after which the mixture was intimately kneaded with stirring. The mixture was then extrusion molded with an extruder to obtain a film of 0.03 inch thickness. This film was allowed to stand for 5 hours in an atmosphere held at 30°C. and RH 25 percent to adjust its moisture content to 0.5 percent. Then, the film was interposed between two glass sheets having a thickness of 3 mm, and heated to 80°C. At a pressure of 10 kg/cm$^2$, the temperature was raised up to 130°C. in the course of 30 minutes, and then, the laminated glass was cooled to room temperature in the course of 30 minutes under the same pressure conditions.

Example 5

A laminated glass was prepared as in Example 4 by repeating the same procedure except that instead of the 70 percent solution in ethylene glycol monobutyl ether of 0.05 part of a cadmium salt of 2-methyl-norbornane-2-carboxylic acid a 70 percent solution in the same solvent of 0.05 part of a barium salt of 2-methyl-norbornane-2-carboxylic acid was used.

Example 6

The polyvinyl acetal resin film obtained in Control 1 was dipped in a 0.15 percent solution of a cadmium salt of 2-methyl-norbornane-2-carboxylic acid in normal hexane and taken from the solution, and dried. The foregoing compound was adhered in an amount of 100 milligrams per square meter to the film surface. In the same manner as in Example 1, after adjusting this film to a moisture content of 0.5 percent by weight, it was sandwiched between two sheets of 3 mm-thick sheet glass and heat-pressed to prepare a laminated glass.

The laminated glasses obtained in the foregoing examples and control experiment were each cut to dimensions of 300 mm × 300 mm. Each of these glasses was then placed in a horizontally disposed square frame having the outside dimensions of 310 mm × 310 mm and inside dimensions of 260 mm × 260 mm. An iron ball 4 kg in weight was then dropped freely from various heights directly above the glass and the state of breakage of the glass was tested with the results shown in Table 1.

Table 1

| Sample Glass of | Ball-Drop Heights | | | | |
|---|---|---|---|---|---|
| | 1.5 m | 2.0 m | 2.5 m | 3.0 m | 3.5 m |
| Example 1 | | | O | O | O |
| Example 2 | | | O | O | O |
| Control 1 | O | X | X | X | X |
| Example 3 | | | O | O | O |
| Example 4 | | | O | O | O |
| Example 5 | | | O | O | O |
| Example 6 | | | O | O | O |

Note: The symbol O denotes that the iron ball did not penetrate the glass. The symbol X denotes that the iron ball penetrated the glass.

Example 7

To 100 parts of the same polyvinyl butyral resin as used in Example 1 was added a mixed solution of a cadmium salt of 2-methyl-norbornane-2-carboxylic acid of the amount shown below and 40 parts of triethylene glycol-di-2-ethylbutyrate, and they were mixed with one another in a milling mixer. Further, the mixture was kneaded by means of a roll at 80°C., and pressed at 120°C. and 20 kg/cm$^2$ to form a 0.030 inch thick film.

The resulting film was interposed between two sheets of glass plate each having a thickness of 3 mm, and heated at 80°C. At a pressure of 10 kg/cm$^2$, the temperature was raised up to 130°C. in the course of 30 minutes. Thereafter, under the same pressure conditions, the laminate was cooled to room temperature in the course of 30 minutes, and then the pressure was released, thereby to produce a laminated glass.

The laminated glass obtained was subjected to a spectrophotometer, and the transmittance of the light in the visible region was measured. The average percent transmission in the visible area was as follow:

| Amount of the cadmium salt of 2-methyl-norbornane-2-carboxylic acid (parts) | Percent transmission (average value) |
|---|---|
| 0.1 | 83% |
| 0.5 | 83% |
| 1.0 | 84% |
| 5.0 | 83% |

Control 2

In the same way as set forth in Example 7, finely divided powders of potassium acetate of the amount shown below were added to 40 parts of the same plasticizer as used in Example 7, and by thorough mixing, a dispersion of potassium acetate was prepared. This dispersion was added to 100 parts of the same polyvinyl butyral resin as used in Example 7, and a 0.030 inch thick film was produced in the same way as set forth in Example 7.

A laminated glass was produced in the same way as set forth in Example 7, and the percent transmission of the light in the visible area was likewise measured. The results are shown below.

| Amount of potassium acetate (parts) | Percent transmission (%, average) |
|---|---|
| 0.05 | 83 |
| 0.2 | 75 |
| 0.4 | 60 |

What is claimed is:

1. A laminated safety glass comprising at least two sheets of glass bonded together with an interlayer consisting of a mixture of a plasticized polyvinyl acetal resin and 0.005 – 0.5 percent by weight, based on the weight of the polyvinyl acetal resin, of a norbornane compound of the formula

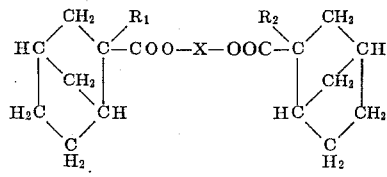

wherein $R_1$ and $R_2$ are each an alkyl group of 1 to 10 carbon atoms and X is a bivalent metal selected from the group consisting of cadmium, barium, zinc and magnesium.

2. A laminated safety glass according to claim 1 wherein $R_1$ and $R_2$ in the formula of said norbornane compound are each a lower alkyl group.

3. A laminated safety glass according to claim 1 wherein $R_1$ and $R_2$ in the formula of said norbornane compound are methyl groups.

4. A laminated safety glass according to claim 1 wherein said norbornane compound is a cadmium salt of 2-methyl-norbornane-2-carboxylic acid.

5. A laminated safety glass according to claim 1 wherein said norbornane compound is contained in an amount of 0.01 – 0.15 percent by weight based on the polyvinyl acetal resin.

6. A laminated safety glass according to claim 1 wherein said plasticized polyvinyl acetal resin is a plasticized polyvinyl butyral resin.

7. A laminated safety glass according to claim 1 wherein the moisture content thereof is 0.2 – 0.8 percent by weight.

8. A laminated safety glass comprising at least two sheets of glass bonded together with an interlayer, said interlayer consisting of a sheet of plasticized polyvinyl acetal resin, to the surface of which has been adhered between 20–150 mg per square meter of the sheet of a norbornane compound of the formula

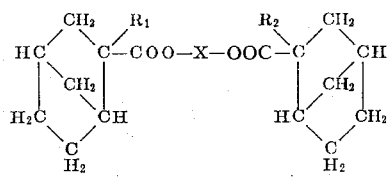

wherein $R_1$ and $R_2$ are each an alkyl group of 1 to 10 carbon atoms and X is a bivalent metal selected from the group consisting of cadmium, barium, zinc and magnesium.

9. A laminated safety glass according to claim 8 wherein $R_1$ and $R_2$ in the formula of said norbornane compound are each a lower alkyl group.

10. A laminated safety glass according to claim 8 wherein $R_1$ and $R_2$ in the formula of said norbornane compound are methyl groups.

11. A laminated safety glass according to claim 8 wherein said norbornane compound is a cadmium salt of 2-methyl-norbornane-2-carboxylic acid.

12. A laminated safety glass according to claim 8 wherein the amount of said norbornane compound to be adhered ranges between 40 – 80 mg per square meter of the sheet.

13. A laminated safety glass according to claim 8 wherein said plasticized polyvinyl acetal resin is a plasticized polyvinyl butyral resin.

14. A laminated safety glass according to claim 8 wherein the moisture content thereof is 0.2 – 0.8 percent by weight.

* * * * *